United States Patent
Grenet et al.

(10) Patent No.: US 9,958,962 B2
(45) Date of Patent: May 1, 2018

(54) AIR POINTER WITH IMPROVED USER EXPERIENCE

(71) Applicant: MOVEA, Grenoble (FR)

(72) Inventors: Pierre Grenet, Grenoble (FR); Guillaume Aujay, Grenoble (FR)

(73) Assignee: Movea, Grenoble (FR)

( * ) Notice: Subject to any disclaimer, the term of this patent is extended or adjusted under 35 U.S.C. 154(b) by 0 days. days.

(21) Appl. No.: 14/580,643

(22) Filed: Dec. 23, 2014

(65) Prior Publication Data
US 2015/0177855 A1   Jun. 25, 2015

(30) Foreign Application Priority Data

Dec. 23, 2013 (EP) ..................................... 13306832

(51) Int. Cl.
*G06F 3/0346* (2013.01)
*G06F 3/038* (2013.01)
*G06F 3/0481* (2013.01)

(52) U.S. Cl.
CPC .......... *G06F 3/0346* (2013.01); *G06F 3/0383* (2013.01); *G06F 3/04812* (2013.01); *G06F 2203/04801* (2013.01)

(58) Field of Classification Search
CPC ...... G06F 3/033; G06F 3/0346; G06F 3/0481; G06F 3/04812; G06F 3/038; G06F 3/0485; G06F 3/0488; G06F 3/04847; G06F 3/011; G06F 3/012; G06F 2203/04801; G06F 3/0354; G06F 3/0383; H04N 21/42204; H04N 21/42222
See application file for complete search history.

(56) References Cited

U.S. PATENT DOCUMENTS

| | | | | |
|---|---|---|---|---|
| 5,929,840 A * | 7/1999 | Brewer | ............... | G06F 3/04812 345/157 |
| 6,380,929 B1 * | 4/2002 | Platt | ..................... | G06F 3/0488 341/34 |
| 7,536,650 B1 * | 5/2009 | Robertson | ............. | G06F 3/0481 715/764 |
| 8,749,494 B1 * | 6/2014 | Delker | .................. | G06F 3/0488 345/173 |
| 9,261,980 B2 * | 2/2016 | Bassompiere | ......... | G01C 21/16 |
| 2009/0235207 A1 * | 9/2009 | Choi | ..................... | G06F 3/0485 715/851 |

(Continued)

FOREIGN PATENT DOCUMENTS

| CN | 103376919 A | 10/2013 |
|---|---|---|
| EP | 2219101 A1 | 8/2010 |
| EP | 2667627 A2 | 11/2013 |

OTHER PUBLICATIONS

Search Report and Written Opinion from European Patent Application No. 113306832, dated May 9, 2014.

(Continued)

*Primary Examiner* — Darlene M Ritchie
(74) *Attorney, Agent, or Firm* — Baker Hostetler LLP

(57) ABSTRACT

A 3D pointing device and a method are disclosed to control an object on a surface and to improve the user experience when the user moves the object beyond the limits of the surface where the object can no longer be visualized. The user experience is enhanced by defining the behavior of a cursor in a margin around the screen.

13 Claims, 6 Drawing Sheets

(56) References Cited

U.S. PATENT DOCUMENTS

| | | | |
|---|---|---|---|
| 2010/0225582 A1* | 9/2010 | Ohta | A63F 13/02 345/158 |
| 2010/0265175 A1* | 10/2010 | Kabasawa | G06F 3/0346 345/159 |
| 2010/0309122 A1* | 12/2010 | Abe | G06F 3/04812 345/157 |
| 2010/0309123 A1* | 12/2010 | Sawai | G06F 3/0346 345/157 |
| 2011/0169734 A1 | 7/2011 | Cho et al. | |
| 2011/0199298 A1* | 8/2011 | Bassompiere | G01C 21/16 345/157 |
| 2012/0119989 A1 | 5/2012 | Van Den Brink | |
| 2013/0063374 A1* | 3/2013 | Lee | G06F 3/0304 345/173 |
| 2013/0113703 A1 | 5/2013 | Zheng et al. | |
| 2013/0167092 A1 | 6/2013 | Yu et al. | |
| 2013/0314396 A1* | 11/2013 | Kang | H04N 21/42204 345/214 |
| 2013/0329957 A1* | 12/2013 | Ebisawa | A61B 3/113 382/103 |
| 2014/0191964 A1* | 7/2014 | McDonald | G06F 3/011 345/158 |
| 2014/0300542 A1* | 10/2014 | Jakubiak | G06F 3/017 345/157 |
| 2014/0317554 A1* | 10/2014 | Song | G06F 3/0481 715/781 |

OTHER PUBLICATIONS

Extended Search Report and Written Opinion from European Patent Application No. 113306832, dated Oct. 13, 2015.

* cited by examiner

AIR POINTER WITH IMPROVED USER EXPERIENCE

FIELD OF THE INVENTION

The present invention relates to the use of 3D pointers. These pointing devices are used for a variety of different purposes: control the functionalities of a TV set or a tablet, using or not a set top box, control a presentation on a desktop or a larger screen, play games, etc. A 3D pointer includes motion sensors which capture the motion imparted to the pointer by a user handling it. In most applications, the motion of the device in space is converted into the position and/or motion of a virtual object, often times a cursor, in a plane, generally a display. By controlling the object and moving it across the plane, the user is able to command the execution of specific functions, like e.g. selection of a program, control of an audio or a video stream, creation of drawings and graphics, etc.

BACKGROUND PRIOR ART

In most cases the plane, or display, is of finite size, but the movements of the pointer are usually not limited in space. This means that the movements of the user can drive the position of the object beyond the limits of the display. First, we consider the case of a conventional 2D computer mouse that the user moves across the horizontal desk surface to move the cursor on a display or screen. It is known that when the user moves too far in a certain direction, the actual cursor stops and remains at the screen border because the cursor cannot move beyond the limits of the screen. The advantage of this principle is that it is quite easy to use the objects at the edges of the screen, such as the scroll bar or the close button, since they seem to have an infinite width (in the direction beyond the screen). Therefore, the user does not have to perform a precise movement to select these objects.

A problem with the behaviour of the 2D mouse at the screen border is that the cursor starts moving as soon as the user reverses direction. This creates an offset between the position of the cursor and the position of the mouse compared to when the user moved the pointer and the position of the cursor was about to leave the screen. A commonly used correction when using a 2D computer mouse is to have the user lift and displace the mouse to cancel this offset.

The 'lift and displace' method does not work for a 3D pointer, which is not supported by e.g. a desk surface and can be freely moved in space. Therefore, other algorithms are preferred for 3D pointers to map the movement of the pointer to the movement of the object on the screen.

As an alternative, the position of the object may be tracked beyond the limits of the screen. This means that the position of the object is calculated as if the screen would be infinite, but the user is not actually able to see the object/cursor. When the calculated position is again within the screen limits, the cursor appears again because it can be shown on the screen. The problem with this solution is that it is more difficult and less user friendly to control e.g. the scroll bar on the side of the screen, or target the buttons on the top right corner, like the close button, because they no longer have an 'infinite' size. Moreover, because the user does not have any visual feedback as long as the cursor is outside the screen limits, it is not easy to predict exactly where and when the cursor will re-enter the screen.

SUMMARY OF THE INVENTION

It is an object of the present invention to overcome the above mentioned limitations by providing an air pointer which is able to accurately control a cursor near the edges of a screen. Thanks to the invention, even if the user is not very skilled in precisely pointing at a border and moves the pointer out of the screen inadvertently, he will be able to use the controls which are located on the borders, like the start button, scroll bar, close and resize buttons.

To this effect, the invention discloses a system for controlling a virtual object on a surface comprising: at least one of sensing and imaging capabilities configured for producing measurements in relation to one of a position, an attitude, and a motion of a pointing device; processing capabilities configured for calculating a first position of the virtual object from the measurements; processing capabilities being further configured to display the virtual object at the first position when the first position is located within a first subset of the surface, and at a second position within the first subset when the first position of the virtual object is outside said first subset and inside a second subset, enclosing the first subset, said second subset having a finite size which depends on the speed of the virtual object.

In an embodiment of the invention, the processing capabilities are further configured to display the second position substantially on a border of the first subset of the surface.

In an embodiment of the invention, the first subset is a rectangle of coordinates (W, H) in a frame of reference of the surface.

In an embodiment of the invention, coordinates (x2, y2) of the second position in the frame of reference of the surface are calculated from coordinates (x1, y1) of the first position in the frame of reference of the surface by a formula of a type (x2, y2)=(min(max(0, x1); W); min(max(0; y1); H)).

In an embodiment of the invention, an offset is added to at least one of coordinates x2 and y2.

In an embodiment of the invention, the processing capabilities are further configured to change the appearance of the virtual object based on the first position, when the first position is outside the first subset.

In an embodiment of the invention, the appearance is based on the distance between the first position and one of the second position and the first subset.

In an embodiment of the invention, the at least one of sensing and imaging capabilities comprise at least an inertial sensor.

In an embodiment of the invention, the at least one of sensing and imaging capabilities comprise at least a camera.

In an embodiment of the invention, processing capabilities are further configured to convert the angles of the device into variations of the horizontal position of the virtual object, said conversion being calculated in one of an absolute mode, a relative mode and a combination thereof based on a pitch angle of the device.

The invention also discloses a system for controlling a virtual object on a surface comprising: at least one of sensing and imaging capabilities configured for producing measurements in relation to one of a position, an attitude, and a motion of a pointing device; processing capabilities configured for calculating a first position of the virtual object from the measurements; said processing capabilities being further configured to display the virtual object at a second position within a first subset of the surface, said second position being calculated according to one of the first position and variations of the first position using a first gain g1 when the first position is located within the first subset and a second gain g2 when the first position is located inside a second subset, enclosing the first subset.

In an embodiment of the invention, the first subset is a rectangle of coordinates (W, H) in a frame of reference of the surface, the first position having first coordinates (x1, y1) and the second position having second coordinates (x2, y2) in said frame of reference.

In an embodiment of the invention, the coordinates (x2, y2) of the second position are calculated from the coordinates (x1, y1) of the first position, using a formula of a type: (x2, y2)=(min(0, x1)*g2+min (max(0,x1), W)*g1+max(x1−W, 0)*g2, min(0, y1)*g2+min (max(0,y1), H)*g1+max(y1−H, 0)*g2), wherein the values of g1 and g2 are comprised between 0 and 1.

In an embodiment of the invention, variations (dx2, dy2) of the second coordinates (x2, y2) of the second position are calculated from variations (dx1, dy1) of the first coordinates (x1, y1) of the first position according to rules of the type: if 0≤x1≤W, dx2=g1*dx1; else dx2=g2*dx1; if 0≤y1≤H, dy2=g1*dy1; else dy2=g2*dy1; wherein values of g1 and g2 are comprised between 0 and 1.

In an embodiment of the invention, the position (x2, y2) of the virtual object is saturated at the edges of the first subset, with 0≤x≤2 W and 0≤x2≤H.

In an embodiment of the invention, the second subset is a rectangle enclosing the first subset and centred on the first subset, said rectangle having a width W2 and a height H2, with $$W2 = \frac{1-g1+g2}{g2} * W, \text{ and } H2 = \frac{1-g1+g2}{g2} * H.$$

In an embodiment of the invention, the width W2 and the height H2 of the second subset and the gain g2 depend on the speed of the virtual object.

In an embodiment of the invention, the second position is calculated using a mode of calculation chosen in a group comprising at least one of at least an absolute mode and a relative mode, the mode of calculation of said second position being switched according to the first position.

The invention also discloses a system for controlling a virtual object on a surface comprising: at least one of sensing and imaging capabilities configured for producing measurements in relation to one of a position, an attitude, and a motion of a pointing device; processing capabilities configured for calculating a first position of the virtual object from the measurements; said processing capabilities being further configured to display the virtual object at a second position within a first subset of the surface, said second position being calculated using a mode of calculation chosen in a group comprising at least one of at least an absolute mode and a relative mode, the mode of calculation of said second position being switched according to the first position.

In an embodiment of the invention, wherein the first subset is a rectangle of coordinates (W, H) in a frame of reference of the surface, the first position having first coordinates (x1, y1) and the second position second coordinates (x2, y2) in said frame of reference.

In an embodiment of the invention, the second coordinates are calculated: in the absolute mode, by a saturation of the first coordinates to the edges of the first subset, by a formula of the type (x2, y2)=(min(max(0, x1); W); min(max (0; y1); H)); in the relative mode, by: the application of the variation (dx1, dy1) of the first coordinates (x1, y1) by a formula of the type: (x2, y2)=(x2+dx1, y2+dy1); the saturation of the second coordinates (x2, y2) to the edges of the first subset, by a formula of the type (x2, y2)=(min(max(0, x2); W); min(max(0; y2); H)).

In an embodiment of the invention, the first subset of the surface is enclosed by a second subset of finite size.

In an embodiment of the invention, processing capabilities are further configured to: switch from relative to absolute mode, if the first position is outside the first and the second subset; switch from absolute to relative mode, if the first position is inside the first subset.

In an embodiment of the invention, the size of the second set depends on the speed of the virtual object.

In an embodiment of the invention, the first subset of the surface is enclosed by a second subset of finite size, and the second position is calculated according to one the first position and the variations of the first position using a first gain g1 when the first position is located within the first subset and a second gain g2 when the first position is located inside the second subset.

The invention also discloses a system for controlling a virtual object on a surface comprising: at least one of sensing and imaging capabilities configured for producing measurements in relation to one of a position, an attitude, and a motion of a pointing device; processing capabilities configured for calculating a first position of the virtual object from the measurements; said processing capabilities being further configured to convert at least an orientation of the device into variations of the horizontal position of the virtual object, said conversion being calculated in one of an absolute mode, a relative mode and a combination thereof based on a pitch angle of the device.

In an embodiment of the invention: in relative mode, a variation ΔX of the coordinate of the virtual pointer on an horizontal axis is obtained by a formula where ΔX=k*Δψ, wherein Δψ is a variation of the yaw angle, and k is a sensitivity factor; in absolute mode at high pitch angles, the horizontal coordinate Xh of the virtual object in the horizontal axis is calculated by a formula where $$\begin{bmatrix} X_h \\ \vdots \\ \vdots \end{bmatrix} = k * \text{gain} * R * \begin{bmatrix} 1 \\ 0 \\ 0 \end{bmatrix},$$

wherein k is the sensitivity factor used in relative mode, gain is a gain factor, R is a rotation matrix of the device In an embodiment of the invention, the gain is calculated by the formula $$\text{gain} = \frac{\Psi_{max}}{\sin(\Psi_{max})},$$

wherein ψmax is the yaw angle which covers half of the screen, between the centre of said screen and one of the left and right edge, for the sensitivity factor k.

In an embodiment of the invention, the coordinates of the virtual object are saturated into the edges of a first subset of the surface, which is a rectangle of coordinates (W, H) in a frame of reference of the surface.

In an embodiment of the invention, a position P of the virtual object is calculated in a margin around the first subset as a combination between the position calculated in absolute mode and the position calculated in relative mode.

In an embodiment of the invention, the position P of the virtual object is calculated by a formula of the type:

$P = \alpha * P_{LP} + (1-\alpha) * P_{HP}$, wherein PLP is the position calculated according to the relative mode, PHP the position calculated according to the absolute mode, and α is a number between 0 and 1 that represents the relative contribution of each mode.

In an embodiment of the invention, the number α progressively decreases between the edge of the first subset and the end of the margin.

In an embodiment of the invention, the size of the margin depends on the size of the virtual object.

The invention makes the air pointer more user friendly and easier to use. In addition, a visual feedback can be given to the user to indicate how far into the margin, i.e. how far away from the screen border, the calculated position is.

BRIEF DESCRIPTION OF THE DRAWINGS

The invention will be better understood and its various features and advantages will become apparent from the description of various embodiments and of the following appended figures.

DETAILED DESCRIPTION

Figure 1B:
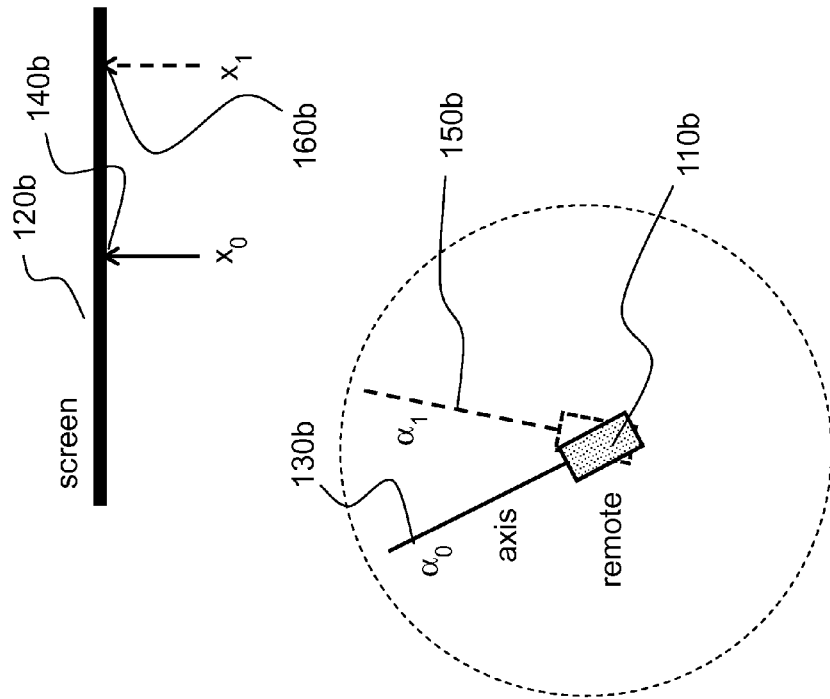
FIGS. 1a and 1b illustrate embodiments of the invention wherein a spherical pseudo-absolute pointing algorithm is used as an alternative to absolute pointing like a laser pointer.

Most 3D pointing devices use either inertial sensors, or a camera, or possibly both.

The inertial sensor based devices use e.g. accelerometers, gyrometers, magnetometers, or any combination of these sensors. The accelerometers and magnetometers may be used to measure the orientation of the device with respect to the gravitational and magnetic field, respectively. The gyrometers may be used to measure the angular velocities of the device. Examples and more details of these systems can be found in European patent application N° 13306334.7 filed by the applicant of the instant patent application.

Camera based devices use a camera incorporated in the device to capture images of the screen, which may be equipped with (infra-red) markers. The position and/or movement of the object on the surface may be deduced from the position of the screen (border) in the image frame. Alternatively, the camera may be incorporated in the display, while the device is equipped with markers. Examples of camera based systems include the Nintendo Wii and the Philips U-Wand.

In the description that follows, the invention is explained using inertial sensor base systems. However, the invention may equally well be applied to camera based systems, or other types of systems.

The basic operating principle of the devices is that the sensors (or cameras) determine motion parameters of the device in space and a processor then maps these motion parameters into position/motion data of an object on a surface, for example a cursor on a display.

The sensing device comprises a power supply and a channel of transmission of motion signals to a controller or a base station, which control/shows the position of the object on the surface. Radiofrequency transmission can be effected with a Bluetooth waveform and protocol or with a Wi-Fi waveform and protocol (Standard 802.11g). Transmission can be performed by infra-red or by radiofrequency. The transmitted signals may be generated by a computation module either embedded in the device itself, or embedded into a base station or distributed between the device and the base station. The device comprises at least a computation module that deals with some processing of the sensors.

This computation module comprises a microprocessor, for example a DSP Texas Instruments TMS320VC5509 for the most demanding applications in terms of computation time, or a 32-bit microcontroller with ARM core, for example one of those from the STR9 family, notably the STR9F12FAW32 from STM. The computation module also preferably comprises a flash memory necessary for storing the code to be executed, the permanent data which it requires, and a dynamic work memory. The computation module receives as input the outputs from the different sensors. On the one hand, angular velocity sensors have the function of measuring the rotations of the device in relation to two or three axes. These sensors are preferably gyrometers. It may be a two-axis gyrometer or a three-axis gyrometer. It is for example possible to use the gyrometers provided by Analog Devices with the reference ADXRS300. But any sensor capable of measuring angular rates or velocities is usable.

It is also possible to use magnetometers and use the measurements of their displacement with respect to the terrestrial magnetic field to determine the rotations with respect to the frame of reference of this field. It is for example possible to use the magnetometers with the reference HMC1001 or HMC1052 from the company Honeywell or KMZ41 from the company NXP. Preferably, one of the sensors is a three-axis accelerometer. Advantageously, the sensors are produced by MEMS (Micro Electro Mechanical Systems) technology, optionally within one and the same circuit (for example reference accelerometer ADXL103 from Analog Devices, LIS302DL from ST MicroElectronics, reference gyrometer MLX90609 from Melixis, ADXRS300 from Analog Devices). The gyroscopes used may be those of the Epson XV3500 brand.

The different sensors can be combined into a '3A3G3M' device, having three accelerometer (A) axes, three gyrometer (G) axes, and three magnetometer (M) axes. This type of sensor combination allows typical IMU (Inertial Measurement Unit) processing, which makes it possible to deliver a dynamic angle measurement. Such a device can deliver smoothed movement information, even for rapid movements or in the presence of ferrous metals that disturb the magnetic field. Many other combinations of A, G and M sensors are also possible depending on the quality of the sensors (e.g. drift, noise) and the application. For example, if the absolute orientation with respect to the earth's magnetic field is not needed, a solution using only A and G sensors might be sufficient if the gyrometers have a low drift.

The algorithms used to map the motion of the device in space into motion of an object on a surface can be of one of two types:

Absolute pointing, wherein the position of the object in the (X,Y) frame of reference of the surface is directly linked to the orientation/position of the pointing device. This means that every time the user holds the pointing device in a certain orientation/position, the orientation/position of the object in the frame of reference of the surface is identical. The most straightforward example is a pointer that acts like a laser pointer, where the position of a point on the object coincides with the intersection of the pointing axes of the device with the surface. In addition, the orientation of the object on the surface may be deducted from the attitude of the device, for example by controlling the orientation by the roll angle of the device. Thus, in an absolute pointing algorithm the attitude of the pointing device is converted into the position (and possibly orientation) of the object on the surface.

Relative pointing, wherein the displacement of the object in relation to a previous position is controlled by the motion of the air pointer. The best known example of relative pointing is the computer mouse. In an air pointer version of the mouse, the angular velocities (in yaw and pitch direction) are converted to cursor displacements $\Delta x$ and $\Delta y$.

Because of the behaviour of the mouse at the screen border, there is no one-on-one relation between the position of the mouse and the position/orientation of the device.

The present invention refers to embodiments where the pointing algorithms that are used convert the position/orientation/motion of the device to a position on the surface, no matter what type of algorithm is used, absolute, relative or a mix of both. The position or orientation may be only partially required depending on the algorithm. For example, if for the orientation the algorithm uses only the pitch and the yaw to control the cursor, the roll angle does not need to be known/calculated.

Figure 1A:
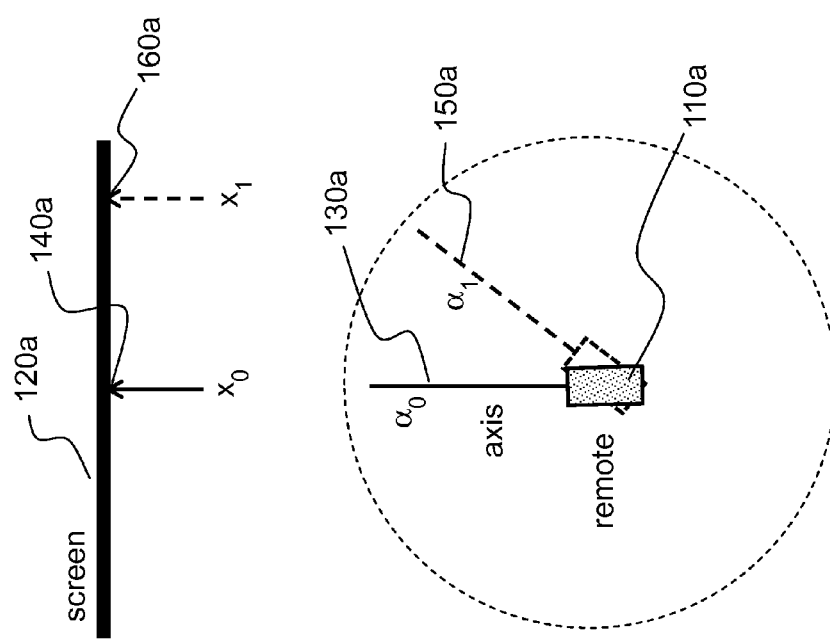

FIGS. 1a and 1b illustrate embodiments of the invention wherein a spherical pseudo-absolute pointing algorithm is used as an alternative to absolute pointing like a laser pointer.

As an alternative to an absolute pointing algorithm, a spherical pseudo absolute mapping algorithm might be used where the yaw and pitch of the device are directly converted to the x and y position of the cursor on the surface, after applying a gain. The advantage is that this mapping algorithm is absolute because every time the user holds the pointing device in a certain orientation, the position of the cursor on the screen is identical, but there is no need to know the exact distance and position of the device with respect to the display.

FIG. 1a shows the remote 110a and the screen 120a in one dimension, where the sphere is represented by the circle. At the initial position, the remote is at angle $\alpha_0$, 130a, which corresponds to position $x_0$, 140a, on the screen. When the remote is rotated to angle $\alpha_1$, 150a, the position on the screen becomes $x_1$, 160a. Note that the remote does not necessarily act as a laser pointer since the direction $\alpha_1$ does not point directly at position $x_1$. The position depends on the gain g according to:

$$x_1 - x_0 = g^*(\alpha_1 - \alpha_0)$$

As shown on FIG. 1b, in the initial position the remote 110b does not have to be aligned with the position of the screen 120b. The pointing is absolute in the sense that, every time the user has the remote in orientation $\alpha_0$, 130b, or $\alpha_1$, 150b, the position on the screen is $x_0$, 140b, or $x_1$, 160b, respectively. Because the pointing is not absolute like a laser pointer, we refer to this method as pseudo absolute.

The relation between the initial or reference orientation $\alpha_0$ and the initial or reference position $x_0$ can be set by the system. For example, the orientation $\alpha_0$ of the device when it is started refers to the position $x_0$, e.g. the center or a corner of the screen. Alternatively, the relation can be set by the user, for example by pressing a button on the remote, indicating that the orientation $\alpha_0$ at the moment of the button press refers to position $x_0$.

The absolute position can be calculated using a 9-axes device comprising accelerometers, gyrometers and magnetometers (AGM), where the magnetometer axes are used for an absolute yaw reference. However, a system with only accelerometers and gyrometers (AG) with limited perturbation (drift and noise) will also work fine. The accelerometers may be used for roll compensation and the conversion of the movements from the reference frame of the device to the reference frame of the display.

Figure 2:
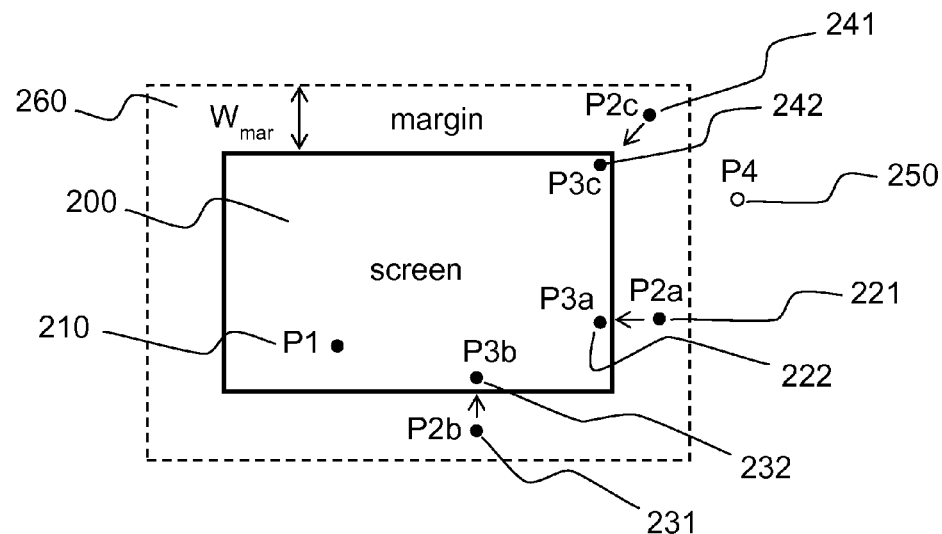
FIG. 2 displays a screen with some surrounding margins according to an embodiment of the invention.

FIG. 2 displays a screen with some surrounding margins according to an embodiment of the invention.

A display screen 200 has a finite size, and when the calculated position is within the boundaries of the screen, a visual feedback of this position can be given to the user, e.g. in the form of a cursor. This is represented by position P1, 210 on FIG. 2. The motions of the user are not limited by the boundaries of the screen, so it is very easy to point outside the screen, for example point P2a, 221. Since the position is outside the actual screen, no visual feedback can be given at this exact position.

In order to indicate to the user the position he or she is pointing at, the position P2a is projected to a position within the screen boundary, where the cursor can be shown at position P3a, 222. This principle can be applied to all boundaries of the screen; position P2b, 231 is projected to position P3b, 232. For calculated positions in the corner regions of the margin (P2c, 241), the projected position coincides with the corner of the screen (P3c, 242).

In absolute pointing the coordinates are usually defined using the interval [0;1], where:
 {0,0} is the top-left screen border
 {1,0} is the top-right screen border
 {0,1} is the bottom-left screen border
 {1,1} is the bottom-right screen border To project the position outside the screen boundaries back to the screen limits, the calculated position can be saturated to the [0;1] interval. Projection the position to the screen limits means that the objects is shown as close as possible to the screen border. Depending on the size and shape of the cursor (with respect to the actual position), a small offset towards the inside of the screen might be added to show the complete cursor.

Consider a screen with width W and height H, and a cursor position with coordinates (x1,y1) that is outside the screen limits. The coordinates (x2,y2) of the projected position on the screen border can be calculated using coordinates (x1,y1) as follows:

$$x2 = \min(\max(0;x1);W)$$

$$y2 = \min(\max(0,y1);H)$$

Because the position (x2,y2) is exactly at the screen limits, a small offset can be added or subtracted as suggested above according to:

$$x2=\min(\max(0;x1);W)\pm\text{offset-}x$$

$$y2=\min(\max(0;y1);H)\pm\text{offset-}y$$

As shown on FIG. 2, the margins 260 have a finite width $W_{mar}$. For example, $W_{mar}=0.2$, meaning the margin equals 20% of the screen size. When the position determined by the system is outside the margins (P4, 250), no (projected) visual feedback is given to the user, i.e. no cursor is shown. The margins might be different on the sides or on the top/bottom, and might depend on the user or the application. Alternatively, the margin size might depend on the speed of the cursor as it leaves (or enters) the screen, e.g. small margins for low speeds and wide margins for high speeds.

Not showing any feedback when the position is outside the margin has the advantage that when the user puts the device down, which is often in a position not pointing to the screen, no cursor is shown.

Showing the cursor all the time, no matter what the position, may also cause issues for spherical absolute pointing mapping algorithms, for example if the user would accomplish a complete 360 degrees turn where the cursor would leave the screen on one side and would have to enter on the other side.

Figure 3:
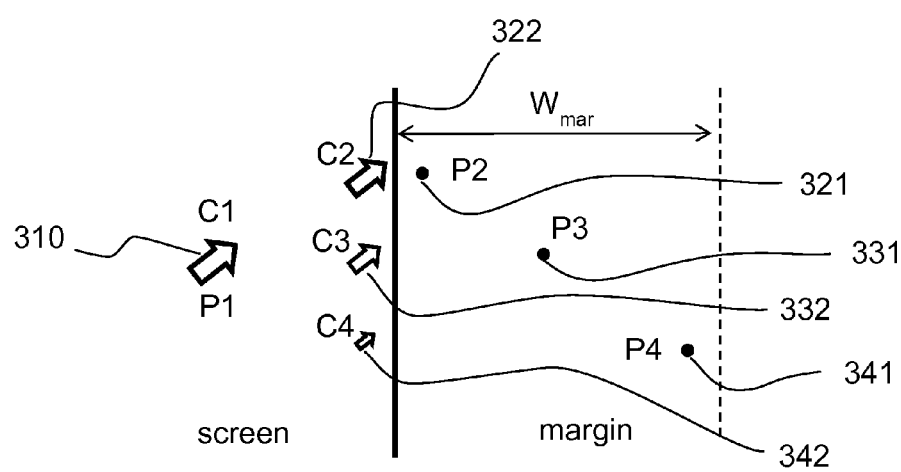
FIG. 3 illustrates an embodiment of the invention where the cursor size is changed depending on the distance between the calculated position and the border.

FIG. 3 illustrates an embodiment of the invention where the cursor size is changed depending on the distance between the calculated position and the border.

To further enhance the user experience and give an indication of how far into the margins the actual position of the cursor is, the visual feedback of the projected cursor can be varied depending on the distance to the screen. FIG. 3 shows an example where the cursor size is varied depending on the position in the margin, relative to the border of the screen, 200. Cursor C1, 310 represents the standard cursor for a position P1 inside the screen. When the position (P2, 321) is outside the screen just inside the margin 260, the cursor size (C2, 322) is nearly identical. As the position (P3, 331) is further away from the border, the cursor size (C3, 332) decreases. As the position approaches the limits of the margins (P4, 341), the cursor (C4, 342) nearly vanishes. The relation between the size of the cursor and the distance between the position and the screen border might be a linear function, or any other monotone function.

Other embodiments where the cursor changes shape, colour, or opacity can also be envisioned, as long as the visual feedback to the user changes depending on the position in the margin.

Figure 4A:
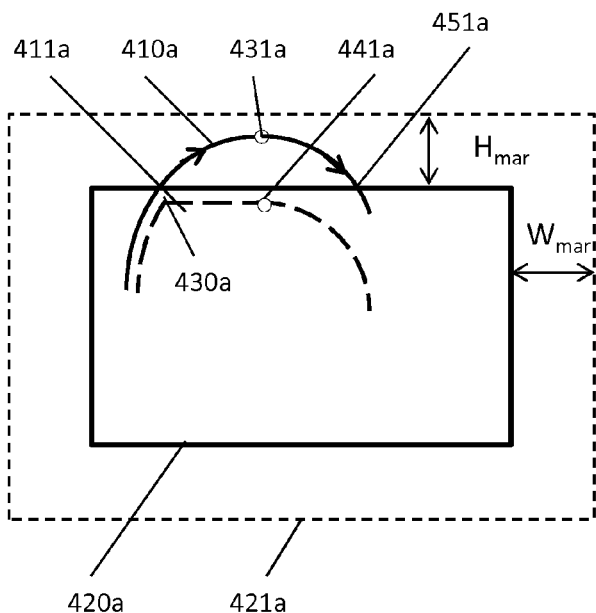
FIGS. 4a and 4b illustrate examples of positions of the cursor according to the positions of the pointer in the embodiment of the invention wherein the position of the cursor is calculated according to a mode of calculation in a group comprising at least an absolute pointing mode and a relative pointing mode, said mode being switched according to the position of the pointer.
Figure 4B:
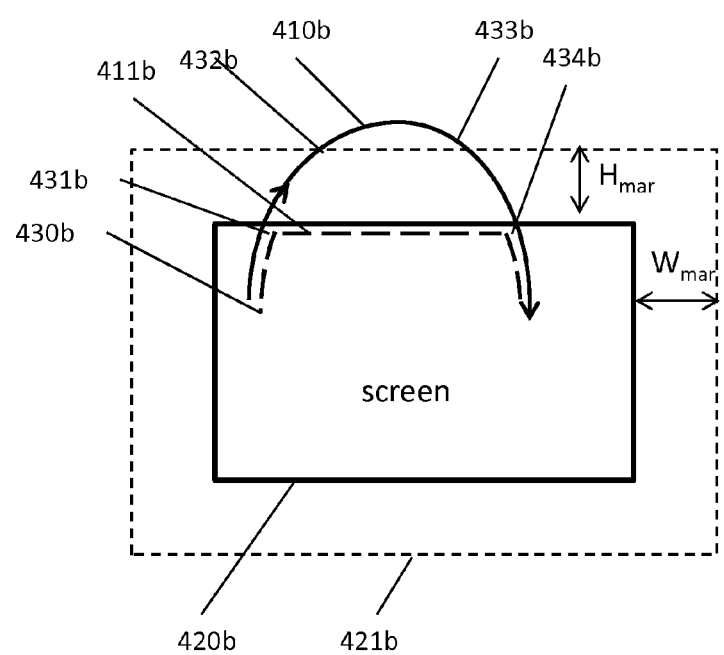

FIGS. 4a and 4b illustrate two examples of positions of the cursor according to the positions of the pointer in the embodiment of the invention wherein the position of the cursor is calculated according to a mode of calculation in a group comprising at least an absolute pointing mode and a relative pointing mode, said mode being switched according to the position of the pointer.

In FIG. 4a, the position of the pointer remains inside the screen and the margins, while on FIG. 4b the position of the pointer moves out of the screen and the margin.

In this embodiment of the invention, the cursor is displayed inside the screen, which is surrounded by a virtual margin. In this embodiment of the invention, the position of the cursor is calculated according to the position of the pointer using a mode of calculation chosen in a group comprising at least one of an absolute mode and a relative mode, the mode of calculation of the position of the cursor being switched according to the position of the pointer in the screen, the margin or outside of the screen and the margin.

In this example, the position Xc of the cursor on the horizontal axis is calculated according to the position X and Y provided by sensors, which would be the position of the cursor if the dimensions of the screen were infinite. Xt is the position of the cursor in the virtual screen formed by the screen, virtual margin, and the region beyond the margin, which represents the whole surface, on the horizontal axis at a given time t. The position Xt of the cursor is calculated at discrete times t−1, t, t+1, etc. . . . . The position Xc of the cursor can be calculated according to the position Xt of the cursor in the virtual screen according to at least an absolute mode and a relative mode, the mode of calculation being switched according to the position X calculated according to sensor data. The position Yc of the cursor on the vertical axis can be calculated according to the position Y calculated by sensors on the vertical axis as well. In a first embodiment of the invention, the Xc and Yc positions of the cursor can be calculated separately using absolute and relative pointing modes. In a second embodiment of the invention, they are calculated using the same mode of calculation. In this second embodiment of the invention, both Xc et Yc positions are calculated in absolute mode if at least one of X and Y positions triggers the switch to an absolute mode, and in a relative mode if at least one of X and Y positions triggers the switch to the relative mode.

In an embodiment of the invention, the screen is positioned in a frame of reference of a vertical surface. In an embodiment, the screen has a width W and a height H, and is positioned between coordinates (0, 0) and coordinates (W, H) in the frame of reference. It is also possible to represent the bottom-right and top-left corners of the screen by positions (0,0) and (1,1) respectively, and apply this scale to the screen itself and the margin. The cursor can therefore been displayed on the corresponding pixels of the screen. For example if the screen is a 1920 by 1080 pixels, a proportionality rule indicates the pixel where the cursor should be displayed. The position of the pointer calculated by the sensors, which would be the position of the cursor if the screen were infinite, can be noted (X, Y) or (x1, y1) for example. The position of the cursor can for example be noted (Xc, Yc) or (x2, y2).

FIG. 4a illustrates an example where the successive positions of the pointer, represented by the line 410a, remain inside the screen 420a and the margin 421a. In this example the screen forms a rectangle between the points of coordinates (Xmin, Ymin) and the point of coordinates (Xmax, Ymax) in the frame of reference, and the margin forms a rectangle around the screen, with an extra width Wmar around left and right edges of the screen, and an extra height Hmar around top and bottom edges of the screen.

In an embodiment of the invention, the position of the cursor is calculated in a relative mode when the pointer remains in the screen, or goes from the screen to the margin. In an embodiment of the invention, in relative mode, the position of the cursor is calculated using the following method:
  the angular displacement of the pointer is applied to the cursor;
  the position of the cursor is saturated at the edge of the screen. In the example of FIG. 4a, this means that the final position of the cursor remains in the rectangle 420a formed by the screen, between points (Xmin, Ymin) and (Xmax, Ymax).

The dashed line 411a represents the evolution of the position of the cursor. While the pointer is in the screen, the changes in the position of the pointer are applied to the position of the cursor. The position of the cursor therefore follows the position of the pointer. Once the pointer leaves the screen 420*a* to enter the margin 421*a*, at point 430*a*, the changes of the position of the pointer are still applied to the cursor, but the position of the cursor is saturated to the edges of the screen 420*a*. Therefore, the position of the cursor follows the position of the pointer on the horizontal axis, but is saturated on the top edge of the screen on the vertical axis. From point 431*a*, the position of the pointer begins to get closer to the screen. The evolution of the position of the pointer is therefore applied to the position of the cursor from point 441*a*. Since this position is inside the screen, it is not saturated at the edges of said screen, and the position of the cursor moves in direction of the centre of the screen while the position of the pointer moves in direction of the screen.

It can be seen that the more the pointer moves outside of the screen, the more important is the difference between the position 441*a*, where the movement of the cursor is no longer saturated and moves towards the centre of the screen, and the position 451*a*, where the pointer re-enters the screen.

FIG. 4*b* illustrates an example of this embodiment of the invention, wherein the pointer moves out of the margin, then moves back inside the margin then inside the screen.

In this example, the pointer, moves along arrow 410*b*, starting at 430*b*, moves towards the top edge of the screen 420*b*; leaving the screen 420*b* to enter the margin 421*b* at point 431*b*; moving towards the top edge of the margin; leaving the margin at point 432*b*; moving outside the margin to re-enter the margin in point 433*b*; moving back towards the screen, to re-enter the screen in point 434*b*.

In an embodiment of the invention, the mode of calculation of the position of the cursor switches from relative mode to absolute mode when the position of the pointer is outside of the margin 421*b*, and switches from absolute mode to relative mode when the position of the pointer moves back into the screen 420*b*. Therefore, in this example, the position of the cursor is calculated in relative mode when the pointer is between points 430*b* and 432*b*; in absolute mode when the position of the pointer is between point 432*b* and 434*b*; and back in relative mode from point 434*b* onwards.

Therefore, in this embodiment of the invention the position of the cursor is always calculated in relative mode when the position of the pointer is inside the screen. It is always calculated in absolute mode when the position of the pointer is outside both of the screen 420*b* and the margin 421*b*. Inside the margin, it can be calculated in relative mode if the pointer has entered the margin from the screen, or in absolute mode if the pointer has entered the margin from the outside.

The dashed line 411*b* represents the evolution of the position of the cursor. From point 430*b* to point 431*b*, it follows the position of the pointer in relative mode. When the pointer is between points 431*b* and 432*b*, the position of the cursor follows the one of the pointer in relative mode, but is saturated at the top edge of the screen. Once the pointer moves outside of the margin at point 432*b*, the mode of calculation switches to absolute mode. In an embodiment of the invention, in absolute mode, the position of the cursor is the position of the pointer saturated at the edges of the screen. While the pointer moves from point 432*b* to point 434*b*, the position of the cursor corresponds to the position of the pointer, which is saturated at the edges of the screen until it reaches point 434*b*. Once the pointer enters the screen at point 434*b*, the mode of calculation switches back to relative mode, and the position of the cursor follows the position of the pointer.

This embodiment of the invention is advantageous. Indeed, it provides an intuitive manner of handling the moves of the cursor, which will follow the movements of the pointer unless the pointer is outside the margin, which is to say far from the screen. Switching to an absolute mode when the pointer is outside the margin allows the difference of position between the cursor and the pointer not being too large when the pointer is re-entering the screen.

Figure 5:
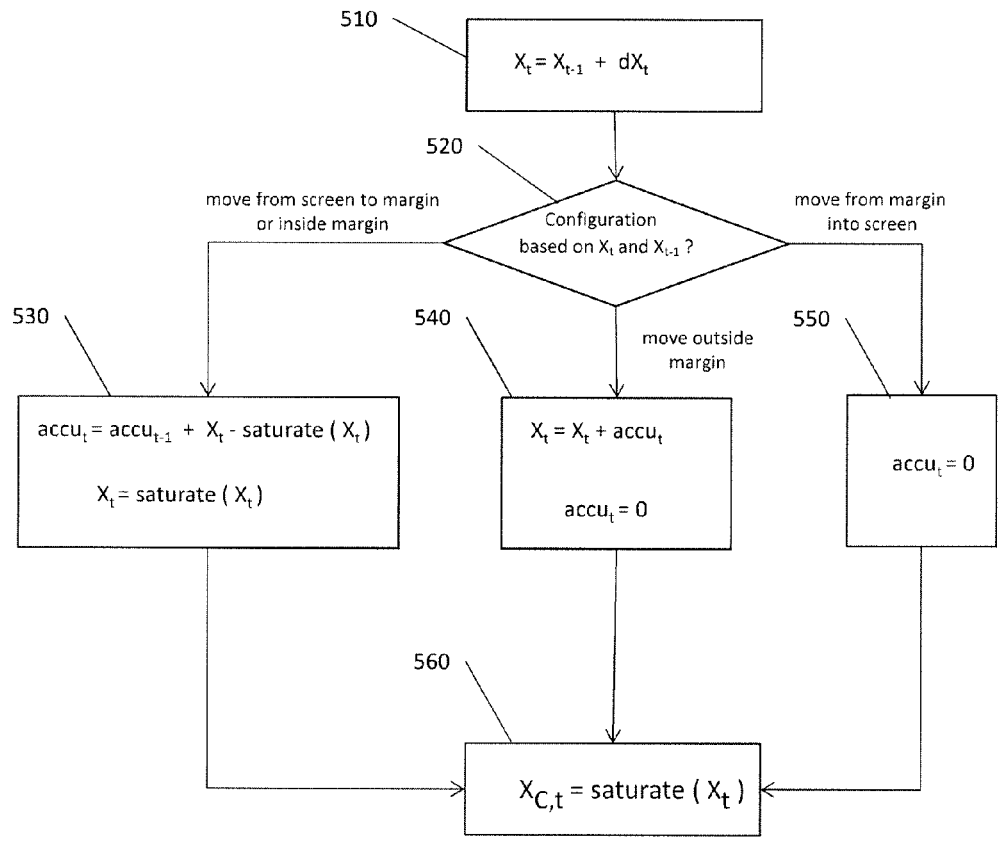
FIG. 5 illustrates an exemplary flow diagram of an embodiment of an algorithm that implements the behaviour described in FIGS. 4a and 4b.

FIG. 5 illustrates an exemplary flow diagram of an embodiment of an algorithm that implements the behaviour described in FIGS. 4*a* and 4*b*.

By way of example, this flow diagram describes the algorithm on horizontal axis only, wherein the screen is located between positions 0 and W, and surrounded by a virtual margin of width Wmar. The position of the cursor in the virtual screen comprising the whole surface at a time t is noted Xt, and the position of the cursor at said time t Xc,t. A skilled person may without particular effort convert these rules for vertical axis, use this algorithm with a different scale/representation of the positions, or mix the horizontal and vertical positions to create rules for switching absolute and relative pointing that depend on 2D position. Meanwhile, a skilled person may choose to use absolute or relative pointing separately on horizontal and vertical axes, or use a single pointing mode for both axes.

In this example, the following notations will be used: Xt is the position of the cursor in the virtual screen extending from the limits of the screen. $accu_t$ is the distance between said position and the screen when the cursor is in the margin and its position is calculated in relative mode. $accu_t$ equals zero if the pointing device is pointing in the screen or outside the screen and the margin. The function saturate (X) represents the saturation of a position within the edges of the screen. For example, on an horizontal axis wherein the screen is located between the coordinates 0 and W, the function saturate (X) will output X if $0 \le X \le W$; 0 if X<0, and W if X>W.

At a first step 510, a variation dXt deduced from the movement of the device captured by sensors is added to the previous position Xt−1 to obtain the position X: Xt=Xt−1+dXt. At step 520, a decision is made based on the position of the cursor in the virtual screen. According to the positions Xt−1 and Xt, the calculations performed at step 520 determine if:

The cursor is moving from the screen to margin or inside the margin. It is for example the case if W<Xt<W+Wmar, and 0<Xt−1<Wmar.

The cursor is moving outside the margin. This is for example the case if Xt−1<W+Wmar, and Xt>W+Wmar;

The cursor is moving from margin into screen. This is for example the case if W<=Xt−1<=W+Wmar, and Xt<W.

If the cursor is moving from screen to margin or inside margin, a step 530 is activated, the distance between the cursor in the virtual screen and the screen is updated, by formula $accu_t = accu_{t-1} + Xt - \text{saturate}(Xt)$. This calculation updates the distance between the position of the cursor in the virtual screen and the edges of the real screen at each iteration. Then the position Xt is saturated at the borders of the screen. This saturation allows the addition of the correct value of dXt at the following iteration.

If the cursor is moving outside the margin, the cursor moves according to an absolute mode, and a step 540 is activated. At step 540, the following operations are performed: $Xt = Xt + accu_t$. This calculation adds the accumulated differences between the position Xt of the cursor and the position Xc,t. Therefore it is possible to start an absolute pointing mode outside the margin. Then the operation $accu_t=0$ cancels the accumulation of distance between the cursor and the screen.

If the cursor is moving from margin into the screen, then a step 550 is activated, in which $accu_t=0$ At the output of each one of these steps a step 560 is activated, in which the position Xc of the cursor at time t is saturated at the borders of the screen: Xc,t=saturate (Xt).

Figures 6A, 6B:
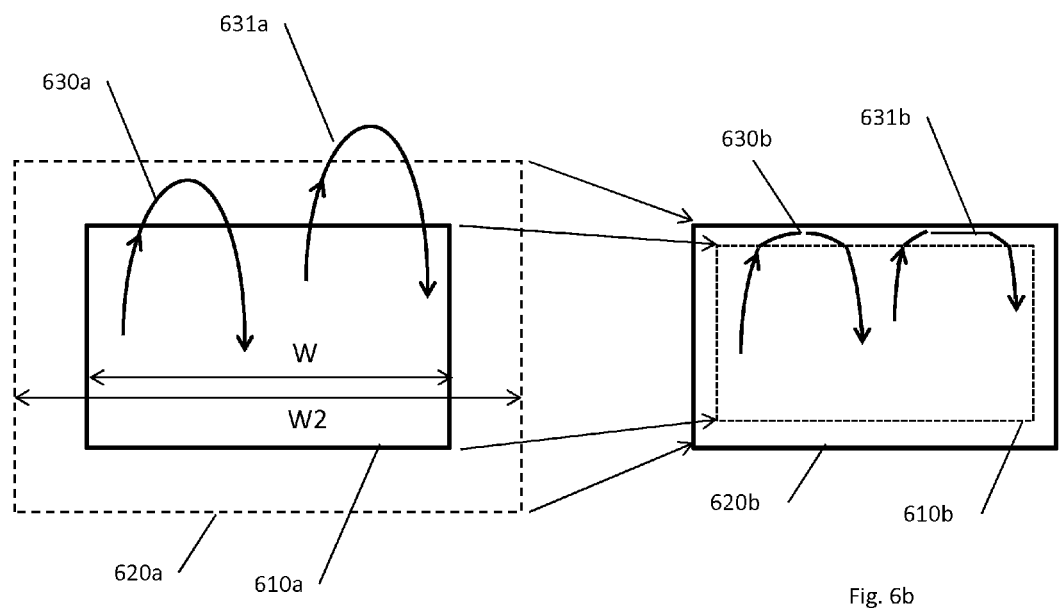
FIGS. 6a and 6b illustrate an embodiment of the invention, wherein the calculation of the position of the cursor uses a different gain if the pointer is in the screen or in a margin around the screen.

FIG. 6a et 6b illustrate an embodiment of the invention, wherein the calculation of the position of the cursor uses a different gain if the pointer is in the screen or in a margin around the screen.

FIG. 6a represents a screen 610a, surrounded by a margin 620a, as well as two trajectories 630a and 631a of the position of a pointer around the screen and the margin. The trajectory 630a remains in the screen and the margin, while trajectory 631a goes outside the margin.

FIG. 6b represents the trajectories 630b and 631b of a cursor, which correspond respectively to the trajectories 630a and 631a of the pointer in an embodiment of the invention. In this example, the positions of the pointer in the screen 610a are compressed to obtain positions of the cursor in a smaller portion 630b of the screen using a larger gain g1, while the positions of the pointer in the virtual margin 631a are compressed using a smaller gain in order that the position of the cursor remains in the screen 620b. If the position of the pointer moves outside of the margin, the position of the cursor is saturated at the edges of the screen 620b.

The trajectory 630b illustrates the changes of gain according to the position of the pointer in the screen or the margin. While the pointer is inside the screen 610a, its position is compressed using a large gain to the region 610b of the screen. While the pointer is in the margin 620a, its position is compressed to the screen 620b using a large gain.

The trajectory 631b illustrates in addition the saturation of the position of the cursor at the edge of the screen 620b when the trajectory 631a of the cursor goes outside of the margin.

This gain can be used in both an absolute or a relative mode. By way of example, formulas to calculate the position of the cursor according to the position of the pointer are given below. In this example, positions are given according to coordinates in a frame of reference of a vertical surface. The screen has a width W and a height H, and is located between a bottom-left corner of coordinates (0,0) in the frame of reference and a top-right corner of coordinates (W,H) in the frame of reference). The coordinates of the pointer are noted (x1,y1) in the frame of reference, while the coordinates of the cursor are noted (x2,y2). The gain for the screen will be noted g1, and the gain for the margin g2, both of which having a positive value between 0 and 1.

In an embodiment of the invention, in absolute mode, the position of the cursor is directly calculated according to the position of the pointer by a formula of the type (x2, y2)=(min(0, x1)*g2+min(max(0,x1), W)*g1+max(x1−W, 0)*g2, min(0, y1)*g2+min(max(0,y1), H)*g1+max(y1−H, 0)*g2). X2 and y2 are afterwards saturated at the edges of the screen: if x2<0, x2=0; if x2>W, x2=W; if y2<0, y2=0; if y2>H, y2=H.

In relative mode, the variations (dx2, dy2) of the position of the cursor are calculated according to the variations (dx1, dy1) of the position of the pointer, and the gain g1 and g2 according to the position of the pointer. For example, the following rules allow the use of a relative mode with two different gains:
  if 0≤x1≤W, dx2=g1*dx1; else dx2=g2*dx1;
  if 0≤y1≤H, dy2=g1*dy1; else dy2=g2*dy1;

The position (x2, y2) obtained is saturated afterwards at the edges of the screen.

Advantageously, the size of the margin can be chosen according to gains g1 and g2 in order that the edges of the margin 620a correspond to the edges of the margin 620b which have the same dimensions than the screen 630a. In an embodiment of the invention, the margin 620a is a rectangle centered on the screen having a width W2 and a height H2. In an embodiment of the invention, the width W2 and the height H2 are chosen so that $$W2 = \frac{1-g1+g2}{g2} * W, \text{ and } H2 = \frac{1-g1+g2}{g2} * H.$$

This embodiment is advantageous, because It allows the user to get a finer control of a cursor near the edges of the screen.

In another embodiment of the invention, the gain may be variable in the margin and/or in the screen. For example, the gain may decrease as the pointer moves further from the screen. In this embodiment, the movement of the cursor gets slower as the pointer gets further from the screen, and the pointer gets closer to the edge of the screen.

Figure 7A:
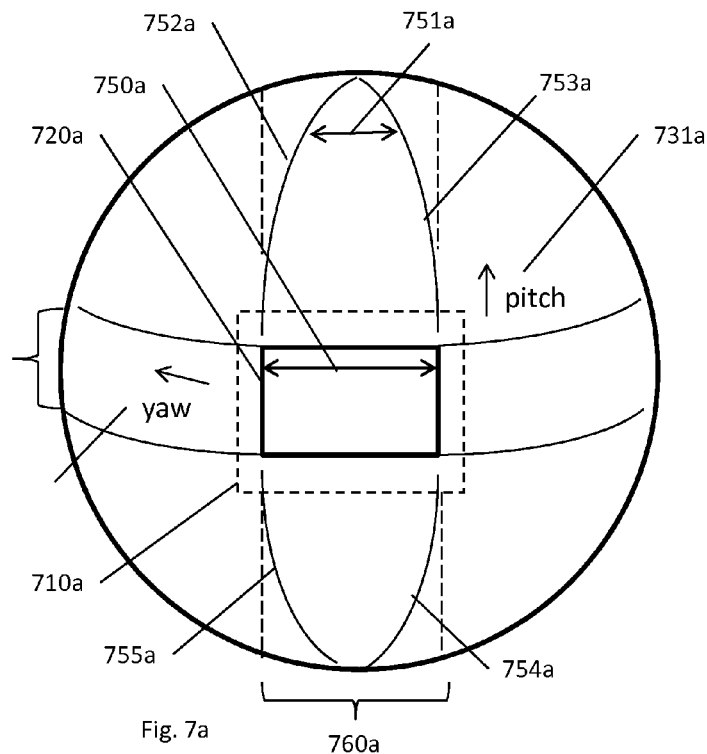
FIGS. 7a and 7b illustrate the conversion of angular values of the pointer into planar values according to an embodiment of the invention.
Figure 7B:
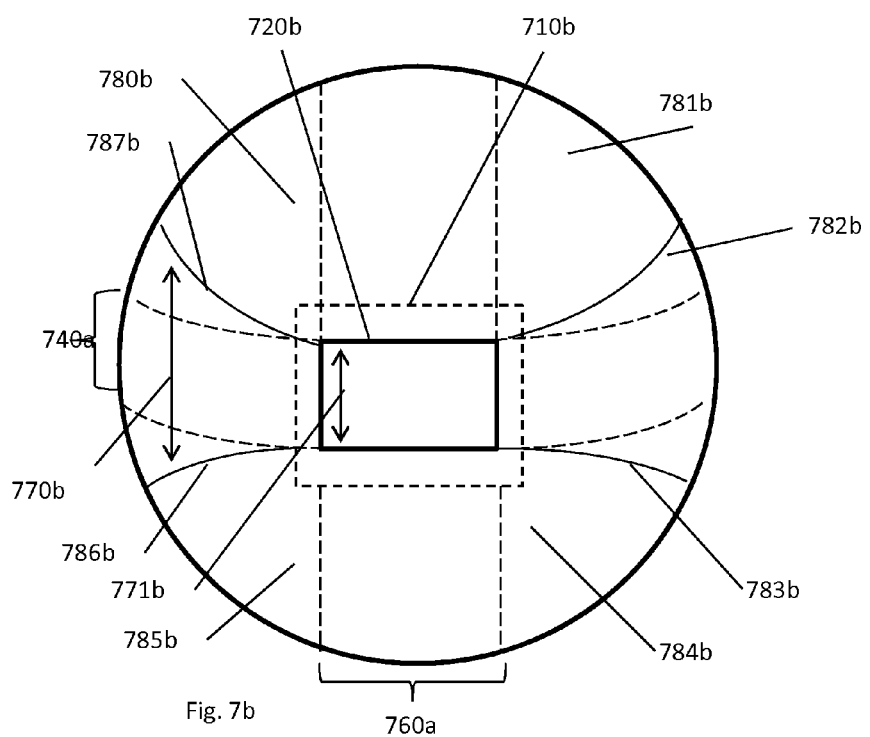

FIGS. 7a and 7b illustrate the conversion of angular values of the pointer into planar values according to an embodiment of the invention.

The horizontal (respectively vertical) displacement of a cursor in the screen is based on the variations of yaw (respectively pitch) angle of the pointing device. Therefore, there is a need for a method of conversion between the angles of the pointing device, and the position of a cursor in a vertical plan.

On FIG. 7a the sphere 700a represents the areas that can be pointed by the pointing device. The device is at the centre of the sphere 700a, which is tangent to the screen 720a, surrounded by a virtual margin 710a. A change in the yaw angle 730a induces a change of the horizontal position of the cursor, while a change in the pitch angle 731a induces a change of the vertical position of the cursor. Since the user and the pointing device is pointing at the center of the sphere, the direction of yaw angle changes and horizontal position changes are inversed: the valued of the yaw angle 730a increases from the right to the left of the sphere 700a, while the horizontal coordinates of the pointer or cursor increase from the left to the right of the sphere. On the contrary, on vertical axis both pitch angle 732a and vertical position of a pointer or cursor increase from the bottom to the top of the sphere.

The conversion of angles of the pointing device into the position of the cursor on the screen can be made using absolute or relative modes. It is also possible to obtain a position by combination of the positions obtained by these two modes. A relative pointing mode is very user friendly because the movement of a device is accurately translated into movements of the cursor. Filtering of the cursor position may be required to remove e.g. trembling effects of the user. However, the position may drift over time, meaning that the relation between the position that the user is pointing at and the position that the cursor is shown at changes. To correct for this drift, an absolute pointing position, with no or limited drift, may be calculated simultaneously based on a sensor fusion algorithm of the inertial sensors. The absolute pointing algorithm is based on the orientation of the device and can be thought of as working like a laser pointing, where the determined cursor position coincides with the intersection of the laser beam and the sphere. However, the absolute cursor position may be too noisy to be used to directly translate the user movements to cursor movements. Fusion between the relative and absolute pointing algorithm may be used to correct the relative cursor position for drift and other accumulated errors, while maintaining the desired response to the movements of the user. Patent application filed under n° PCT/EP2014/070619 discloses a method for the transition between relative and absolute pointing methods. However, it fails to teach a method that uses both relative and absolute pointing at the portions of space where they are the most suited.

The relative conversion of angles to position of the cursor on the horizontal axis consists into converting changes in the yaw angle of the device into changes in the horizontal (x) axis of the screen. The relative conversion of changes in the angles into changes in the horizontal position of the cursor depends on a conversion ratio which can be set by the user in order to adjust the sensitivity of a pointing device. Therefore, there exists a relation between the changes in the yaw angle and changes of the position of the cursor. Let us note $\psi$ the yaw angle, $\Delta\psi$ the variation of the yaw angle, X the horizontal position of the cursor and $\Delta X$ the variation of the horizontal position of the cursor. We therefore have a relation of the type $\Delta X = k*\Delta\psi$, wherein k is a coefficient of proportionality which depends on the units in which X and $\psi$ are expressed, and on the desired sensitivity. X can be for example expressed in pixels, inches, cm or meters, while $\psi$ may be expressed in radians or degrees.

This factor also provides a value $\psi_{max}$, which is the value of the yaw angle which is necessary to move from the center to one of right and left edges of the screen. If W is the width of the screen, expressed in the same unit than X, we have the following relationship: $\psi_{max} = 0.5*W/k$.

This method is very suitable for low pitch angles, but does not work very well for high pitch angles. In an standard example where the pointing device has a pitch which makes that it points inside the screen and the device is located at a distance to the screen which is in relation to the size of the screen, the relative conversion of angles to horizontal position of the cursor works well in a horizontal band 740a, which approximately corresponds to the height of the screen, but will be less efficient above or below this horizontal band, and becomes less efficient as the pitch angle increases.

Indeed, the gain between the amplitude of the device motion and the yaw angle change, and therefore the displacement of the cursor in the horizontal axis varies with the pitch. Moreover, the spherical representation of the angles of a pointing device has a discontinuity when the pitch angle approaches 90°. This issues is well known as the "Jimbal lock".

By way of example, the large angular movement 750a at a low pitch angle will yield the same horizontal displacement of the cursor as the short angular movement 751a at a high pitch angle. The movement of the cursor may therefore become uneasy to control and unpleasant for the user at high pitch angles. The evolution of the gain in the yaw angle to horizontal displacement according to pitch angle is globally represented by curves 752a, 753a, 754a and 755a.

In order to overcome this issue, in a embodiment of the invention, we use an absolute pointing algorithm, which directly converts the angles of the device into a horizontal position of the cursor. This algorithm may notably be used for high pitch angles in a vertical band 760a which extends the screen above and below said screen. The general principle of this algorithm is to obtain an horizontal value by projecting the orientation of the pointing device onto the sphere of the figure, which is tangent to the screen, and then to project the obtained point onto the horizontal axis, applying a gain which allows the band to cover the full screen, and permits the smooth transition between the relative and the absolute pointing.

The orientation of the pointing device may be represented by a rotation matrix which converts the output of the sensors from the device frame to the reference frame of the user. Different algorithms can be applied to obtain R, depending on the number of degrees of freedom of the sensors. For instance, different types of Kalman filters such as those disclosed in European application n° EP 2307943 can be applied. Other methods have been proposed in European patent application published under n° EP2754012, where the representation uses an intermediate projection surface, or in European Application n° EP 2718670, where Triad of Quest algorithms are used. This matrix R is multiplied by vector $$\begin{bmatrix} 1 \\ 0 \\ 0 \end{bmatrix}$$

to project said point on the sphere and then the horizontal axis. The factor of sensitivity k may also be applied in order for the user to get the desired behaviour in terms of sensitivity. A gain shall also be applied in order that the vertical band covers the whole screen and ensure the continuity between relative and absolute pointing. In an embodiment of the invention, this gain has a value $$\text{gain} = \frac{\Psi_{max}}{\sin(\Psi_{max})}.$$

In an embodiment of the invention, the horizontal position Xh of the cursor is therefore obtained in absolute mode according to a gain and the rotation matrix R of the pointer, for example by the formula:

$$\begin{bmatrix} X_h \\ \vdots \\ \vdots \end{bmatrix} = k*\text{gain}*R*\begin{bmatrix} 1 \\ 0 \\ 0 \end{bmatrix}$$

At the top and bottom borders of the screen, Xh equals $k*\Psi$, which allows for a smooth transition between the mode for a low pitch and the mode for a high pitch.

Wherein the sensitivity factor k is the factor used in relative mode, the gain has a value $$\text{gain} = \frac{\Psi_{max}}{\sin(\Psi_{max})},$$

R represents the rotation matrix of the pointer, and the vector $$\begin{bmatrix} 1 \\ 0 \\ 0 \end{bmatrix}$$

a projection on the horizontal axis.

The advantage of this solution is that the cursor can be shown at high pitch angles and has a coherent behaviour for all angles in pitch and yaw combined. If the pointing position is outside the screen, the cursor will be shown at the border of the screen with a smooth movement wherever the user points.

In order to avoid jumps or unwanted behaviours when switching from one algorithm to the other one, it is desirable to use a smooth transition. In an embodiment of the invention, this transition is made in the virtual margin 710a of the screen. In an embodiment of the invention, the position of the cursor during the transition is a combination of two positions, a position $P_{LP}$ which is a position calculated according to a low pitch algorithm or relative algorithm, and a position $P_{HP}$ which is a position calculated according to a high pitch or absolute algorithm. For example the position P of the cursor can be computed as: $P=\alpha*P_{LP}+(1\times\alpha)*P_{HP}$, wherein α represents the relative contribution of the low pitch algorithm, and is a positive number comprised between 0 and 1.

In order to create a smooth transition between pointing algorithm, α may have a value of α=1 within the screen, α=0 above and below the outer vertical limits of the margin, and progressively decrease from the border of the screen to the margin. The change in a with the distance from the screen can be for example linear, or of a higher order.

In this embodiment of the invention, a relative algorithm is used in the screen 720a and a band 740a which represents an horizontal extension of the screen, a combination of a relative and absolute pointing algorithm in the margin 710a, and an absolute pointing algorithm in the rest of the band 760a.

This embodiment of the invention is advantageous, because it allows the use the best algorithm for horizontal pointing whatever the pitch of the pointing device is, while providing smooth transitions when switching from one algorithm to another.

Such spherical representation is also useful when a user is turning around himself, therefore pointing his back to the screen. In this case, when the user starts turning around, the position of the cursor will be saturated on the left or right corner on the screen. It is not desirable that the position of the cursor suddenly jumps on the other edge of the screen once the user has performed half a turn. On the contrary, with this spherical representation, it is possible that the cursor progressively goes to the other side of the screen while the user is turning around, for example along the top of bottom of the screen.

The FIG. 7b represents a second embodiment of the invention for the transition between a relative and an absolute pointing algorithm. In this embodiment, the gains in the vertical and horizontal axis vary according to the distance from the screen. The further the pointer is from the screen in the sphere, the smaller the gain will be. This is to say, when the pointer moves away from the screen, a larger move of the pointing device is necessary to produce the same movement in the screen. For example, a large movement 770b near the edges of the sphere will result in a smaller movement 771b in the screen. The evolution of the gain between the movement of the pointer and the movement in the screen is represented by the curves 780b, 781b, 782b, 783b, 784b, 785b, 786b, 787b.

In this embodiment, any move of the pointer within these curves provides a feedback of the cursor within the screen. This embodiment is therefore advantageous, because it reduces the size of the regions of the sphere in which a change in the orientation of the pointer does not provide a direct feedback to the user, for example because the cursor stays in a corner of the screen.

The embodiments described above are described by means of example only. They can be used separately or in combination.

For example, it is possible to switch from a relative to an absolute pointing mode as described in FIGS. 4 and 5, while the size of the margin depends on the speed of the object.

It is also possible to use a different gain if the position of the pointer is in a screen or in a virtual margin around the screen, as in FIGS. 6a and 6b, while the size of virtual margin varies according to the speed of the pointer.

It is also possible to switch from a relative to an absolute pointing mode as described in FIGS. 4 and 5, while each of these modes using a different gain if the pointer is in the screen or in the margin.

It is also possible to convert angular values of the pointer into planar values with a relative and an absolute algorithm, as depicted in FIGS. 7a and 7b, while the size of the margin for progressively switching between the representations depends on the speed of the pointer.

The algorithms described above to calculate the position of the object on the surface only serve as examples. It is irrelevant for the invention how the position of the object is obtained, be it using the position, orientation and/or motion of the device equipped with inertial sensors or cameras.

The examples disclosed in this specification are only illustrative of some embodiments of the invention. They do not in any manner limit the scope of said invention which is defined by the appended claims.

The invention claimed is:

1. A system for controlling a virtual object on a surface comprising:
   at least one of a camera, accelerometer, gyrometer, magnetometer, or any combination thereof configured for producing measurements in relation to one of a position, an attitude, and a motion of a pointing device;
   a microprocessor and a memory configured for calculating a first position pointed by the pointing device in the surface or in a virtual space around the surface from the measurements;
   said microprocessor and memory being further configured to display the virtual object at a second position in the surface, said second position being calculated according to one of the first position and variations of the first position using a first gain g1 when the first position is located in the surface and a second gain g2 when the first position is located inside a subset of the virtual space, enclosing the surface, the first gain g1 and the second gain g2 being defined in order that 0<g2<g1<1, and in order that the second position is displayed at an edge of the surface when the first position is at an edge of the subset of the virtual space, wherein the surface is a rectangle of width W and height H, and the subset is a rectangle of width W2 and height H2 centred around the surface, and wherein:

$$W2 = \frac{1-g1+g2}{g2} \cdot W;$$

$$H2 = \frac{1-g1+g2}{g2} \cdot H.$$

2. The system of claim 1, wherein the coordinates (x2, y2) of the second position are calculated from the coordinates (x1, y1) of the first position, using a formula of a type: (x2, y2)=(min(0, x1)*g2+min(max(0, x1), W)*g1+max(x1−W, 0)*g2, min(0, y1)*g2+min(max(0,y1), H)*g1+max (y1−H, 0)*g2), wherein the values of g1 and g2 are comprised between 0 and 1.

3. The system of claim 1, wherein variations (dx2, dy2) of the second coordinates (x2, y2) of the second position are calculated from variations (dx1, dy1) of the first coordinates (x1, y1) of the first position according to rules of the type: if 0≤x1≤W, dx2=g1*dx1; else dx2=g2*dx1; if 0≤y1≤H, dy2=g1*dy1; else dy2=g2*dy1; wherein values of g1 and g2 are comprised between 0 and 1.

4. A system for controlling a virtual object on a surface comprising:
at least one of a camera, accelerometer, gyrometer, magnetometer, or any combination thereof configured for producing measurements in relation to one of a position, an attitude, and a motion of a pointing device;
a microprocessor and a memory configured for calculating a first position pointed by the pointing device in the surface or in a virtual space around the surface from the measurements;
said microprocessor and memory being further configured to display the virtual object at a second position in the surface, said second position being calculated using a mode of calculation chosen from a group comprising at least one of at least an absolute mode and a relative mode, the mode of calculation of said second position being switched according to the first position in order that:
when the first position is within the surface, the second position is calculated using the relative mode;
when the first position is outside a subset of the virtual space, said subset enclosing the surface, the second position is calculated using the absolute mode;
when the first position is in the subset, the second position is calculated using the relative mode if the first position entered the subset from the surface, and using the absolute mode, if the first position entered the subset from the virtual space outside of the subset;
wherein the surface is a rectangle of coordinates (W, H) in a frame of reference of the surface, the first position having first coordinates (x1, y1) and the second position having second coordinates (x2, y2) in said frame of reference, and wherein the second coordinates are calculated:
in the absolute mode, by a saturation of the first coordinates to the edges of the surface, by a formula of the type (x2, y2)=(min(max(0, x1); W); min(max(0; y1); H));
in the relative mode, by:
the application of the variation (dx1, dy1) of the first coordinates (x1, y1) by a formula of the type: (x2, y2)=(x2+dx1, y2+dy1);
the saturation of the second coordinates (x2, y2) to the edges of the subset, by a formula of the type (x2, y2)=(min(max(0, x2); W); min(max(0; y2); H)).

5. The system of claim 4, wherein the second position is calculated according to one of the first position and the variations of the first position using a first gain g1 when the first position is located within the surface and a second gain g2 when the first position is located inside the subset.

6. A system for controlling a virtual object on a surface comprising:
at least one of a camera, accelerometer, gyrometer, magnetometer, or any combination thereof configured for producing measurements in relation to one of a position, an attitude, and a motion of a pointing device;
a microprocessor and a memory configured for calculating a first position of the virtual object from the measurements;
said microprocessor and memory being further configured to convert at least an orientation of the device into variations of the horizontal position of the virtual object, said conversion being calculated in one of an absolute mode, a relative mode and a combination thereof based on a pitch angle of the device, wherein:
in relative mode, a variation of the horizontal coordinate of the virtual pointer is obtained based on a variation of a yaw angle and a sensitivity factor; and
in absolute mode a horizontal coordinate of the virtual object is calculated by applying a gain and the sensitivity factor on a rotation matrix of the device;
in a first subset of the surface, a position P of the virtual object is calculated as a weighted sum of the position calculated according to the relative mode, and the position calculated according to the absolute mode;
the first subset defines a margin around the surface;
the position P of the virtual object is calculated by a formula of the type: $P=\alpha*P_{LP}+(1-\alpha)*P_{HP}$, wherein $P_{LP}$ is the position calculated according to the relative mode, $P_{HP}$ the position calculated according to the absolute mode, and α is a
number between 0 and 1 that represents the relative contribution of each mode.

7. The system of claim 6, wherein the coordinates of the virtual object are saturated into the edges of a second subset of the surface, which is a rectangle of coordinates (W, H) in a frame of reference of the surface.

8. The system of claim 6, wherein the number α progressively decreases between an edge of the second subset and an edge of the first subset.

9. The system of claim 6, wherein the size of the first subset depends on the speed of the virtual object.

10. The system of claim 6 wherein:
In the relative mode, a variation ΔX of the coordinate of the virtual pointer on an horizontal axis is obtained by a formula where ΔX=k*ΔΨ, wherein ΔΨ is a variation of the yaw angle, and k is a sensitivity factor;
in the absolute mode at high pitch angles, the horizontal coordinate Xh of the virtual object in the horizontal axis is calculated by a formula where $$\begin{bmatrix} X_h \\ \vdots \\ \vdots \end{bmatrix} = k*\text{gain}*R*\begin{bmatrix} 1 \\ 0 \\ 0 \end{bmatrix},$$

wherein k is the sensitivity factor used in relative mode, gain is a gain factor, and R is a rotation matrix of the device.

11. The system of claim 10, wherein the gain is calculated by the formula $$\text{gain} = \frac{\Psi_{max}}{\sin(\Psi_{max})},$$

wherein Ψmax is the yaw angle which covers half of the surface, between the centre of said surface and one of the left and right edge, for the sensitivity factor k.

12. A system for controlling a virtual object on a surface comprising:

at least one of a camera, accelerometer, gyrometer, magnetometer, or any combination thereof configured for producing measurements in relation to one of a position, an attitude, and a motion of a pointing device;

a microprocessor and a memory configured for calculating a first position of the virtual object from the measurements;

said microprocessor and memory being further configured to convert at least an orientation of the device into variations of the horizontal position of the virtual object, said conversion being calculated in one of an absolute mode, a relative mode and a combination thereof based on a pitch angle of the device, wherein:

in relative mode, a variation of the horizontal coordinate of the virtual pointer is obtained based on a variation of a yaw angle and a sensitivity factor;

in absolute mode a horizontal coordinate of the virtual object is calculated by applying a gain and the sensitivity factor on a rotation matrix of the device;

in the relative mode, a variation $\Delta X$ of the coordinate of the virtual pointer on an horizontal axis is obtained by a formula where $\Delta X = k*\Delta\Psi$, wherein $\Delta\Psi$ is a variation of the yaw angle, and k is a sensitivity factor; and in the absolute mode at high pitch angles, the horizontal coordinate Xh of the virtual object in the horizontal axis is calculated by a formula where $$\begin{bmatrix} X_h \\ . \\ . \end{bmatrix} = k*\text{gain}*R*\begin{bmatrix} 1 \\ 0 \\ 0 \end{bmatrix},$$

wherein k is the sensitivity factor used in relative mode, gain is a gain factor, and R is a rotation matrix of the device.

13. A system for controlling a virtual object on a surface comprising:

at least one of a camera, accelerometer, gyrometer, magnetometer, or any combination thereof configured for producing measurements in relation to one of a position, an attitude, and a motion of a pointing device;

a microprocessor and a memory configured for calculating a first position of the virtual object from the measurements;

said microprocessor and memory being further configured to convert at least an orientation of the device into variations of the horizontal position of the virtual object, said conversion being calculated in one of an absolute mode, a relative mode and a combination thereof based on a pitch angle of the device, wherein:

in relative mode, a variation of the horizontal coordinate of the virtual pointer is obtained based on a variation of a yaw angle and a sensitivity factor; and in absolute mode a horizontal coordinate of the virtual object is calculated by applying a gain and the sensitivity factor on a rotation matrix of the device;

and wherein the gain is calculated by the formula $$\text{gain} = \frac{\Psi_{max}}{\sin(\Psi_{max})},$$

wherein $\Psi_{max}$ is the yaw angle which covers half of the screen, between the centre of said screen and one of the left and right edge, for the sensitivity factor k.

* * * * *